UNITED STATES PATENT OFFICE.

GEORGE LEZINSKY, OF NEW YORK, N. Y.

EXPLOSIVE COMPOUND AND PROCESS OF PRODUCING THE SAME.

No. 909,915.      Specification of Letters Patent.      Patented Jan. 19, 1909.

Application filed November 1, 1907. Serial No. 400,279.

*To all whom it may concern:*

Be it known that I, GEORGE LEZINSKY, a citizen of the United States, and a resident of New York city, in the county of New York and State of New York, have invented certain new and useful Improvements in Explosive Compounds and Processes of Producing the Same, of which the following is a specification.

This invention relates to explosive compounds and it is my purpose to provide an explosive of great safety, stability, efficiency and effectiveness, and which will not deteriorate or change with age.

Furthermore, I provide an explosive which is not susceptible to, or affected by, climatic conditions—which will not freeze, or melt, and when exploded or burned, will give forth no noxious fumes or gases; being, therefore particularly advantageous for use in underground work.

Furthermore, I produce an explosive the component parts of which are susceptible to the action of water so that the mixing, forming or granulation of this explosive is accomplished by the use of water alone, and thus there is entire safety in the process of manufacture and no danger of explosion. By the use of water, a considerable portion of the chlorate of potash used in producing this explosive as well as a portion of the nitrated product is put into solution so that the two ingredients are most intimately combined. The result is a nitrate product impregnated with chlorate of potash.

Furthermore, I produce an explosive which is a homogeneous mass composed of a combination of an oxidizing agent and a nitrated product mixed with water, or other fluid, so that the oxidizing agent, which is soluble in water, is wholly, or partly, dissolved and absorbed by, and uniformly combined with, the nitrated product.

Furthermore, my invention consists of a novel and improved method of making explosives.

In carrying out my invention, I take a mixture of ordinary commercial resin and a grain or cereal of the general character of ordinary wheat and finely pulverize each of these materials, and make a mixture of the same of various proportions from about two parts in weight of the resin to from one to three parts in weight of the cereal or grain. Upon, or into, this mixture, I pour and mix just a sufficient quantity of ordinary commercial nitric acid (being from 36 degrees Baumé to 42 degrees Baumé) to bring all of this mixture into a homogeneous mass, consisting of a porous cake. If the materials are cold they should be heated until the action commences. This mass, or cake, is dried and is then finely pulverized. For lack of a better name I have referred to this product as a nitrated product, but I believe there is, strictly speaking, not a complete nitration, but the action consists not only of the substitution of a $NO_2$ radical in the resin, but also of a hydrolysis of the starch in the pulverized cereal, forming a water soluble gumming mass. A specific illustration of the proportions of resin, cereal and acid which may be used in producing the nitrated product for my explosive is as follows: 53 per cent. by weight of resin; 27 per cent. by weight of ordinary wheat; and 20 per cent. by weight of nitric acid of 38° Baumé. To one part by weight of this nitrated product I add three parts by weight of chlorate of potash to produce my explosive compound. I have found upon analysis that my nitrated product contains approximately from 20 to 50 per cent. of water-soluble matter, according to the proportion of ingredients used in making it. It may contain even less without departing from the spirit of my invention. This nitrated product is in itself non-explosive, and in order to produce my explosive compound, I mix together this nitrated product and chlorate of potash (or other oxygen yielding substance) in the proportion of from one part in weight of the nitrated product to from one to three parts in weight of the chlorate of potash. I then add to this mixture a sufficient quantity of water to mix the same into a homogeneous mass. This mass is then formed or molded into sticks, cakes, lumps or grains as desired and is then dried and is ready for use.

I do not, in producing my explosive, get or desire to get a nitrated product or an explosive which is unaffected by water, but get and desire to get a nitrated product and an explosive which, without an independent coating or protective covering, is susceptible to water. The purpose of this is to obtain and be able to obtain the results and combinations herein described, and in order, by means of water alone, to bring this explosive into a homogeneous mass, which, before drying, can be formed or molded into sticks, cakes, lumps or grains.

Since I do not wash my nitrated product with water or other liquid or in any manner remove any of the constituent parts of the product produced by subjecting grain and resin to nitric acid as indicated, but mix that entire product with the chlorate of potash, it follows that the ingredients of the mixture are in such condition as to be either partially dissolved by the water which is added or brought into such fluid condition as to flow together and form a solidified homogeneous mass in which the nitrated product is thoroughly impregnated with the chlorate of potash. I find that a considerable portion of the nitrated product produced as above described is in such condition that it would be dissolved or carried away if that product were washed. I believe that this condition of the nitrated product is what enables me to bring my powder into solidified or stick form by the use of water, and I further believe that I am the first to make a chlorate powder in solidified form as distinguished from the granular form.

As this explosive, as described, is susceptible to water and when wet its explosive qualities are impaired, I make this explosive adapted for use in water or in wet places by dipping the dried sticks, cakes, lumps or grains, into which it has been molded or formed, into melted paraffin, or similar substance, forming a water proof coating over the entire surface of each form, or inclosing such sticks, cakes, lumps or grains in a water proof covering. This coating in no manner interferes with the efficiency of the powder. This coating or covering of the dried stick, cake, lump or grain of the explosive in this manner, also adds to the stability, safety and keeping qualities of the explosive, since this coating or covering also prevents any action of the air or atmosphere on the explosive which might bring about a decomposition.

The object of varying the proportions of the quantity of resin and the quantity of grain or cereal used in the production of the nitrated product, and in varying the proportions of the quantity of the nitrated product and the quantity of chlorate of potash used in the production of the explosives is to procure explosives of varying degrees of force and rapidity of explosive action, and adapted for various uses and purposes. The explosive of greatest force and most rapid in explosive action is produced by using the smallest proportionate quantity of the grain or cereal to the resin in producing the nitrated product and by using the greatest proportionate quantity of the chlorate of potash to the nitrated product in producing the explosive. The explosive of least force and least rapidity of explosive action is produced by using the greatest proportionate quantity of the grain or cereal to resin in producing the nitrated product and by using the least proportionate quantity of chlorate of potash to the nitrated compound in producing the explosive. By varying in this way the proportions of the materials used in producing the nitrated product and the proportions of the nitrated product and the chlorate of potash, I produce explosive compounds ranging in force and explosive action from the highest grades of explosives in common use to ordinary black powder used for blasting and other purposes; and I also produce an explosive adapted to and of excellent quality for use in firearms and ordnance.

All the powders manufactured, as herein described, burn slowly in the open air and with considerable deflagration and the stronger the powder manufactured by this process the slower it burns. The base itself is a non-explosive and the powders manufactured therewith as herein described may be employed with much more safety than the ordinary nitro-glycerin powders now in use or any powder with which I am acquainted having similar explosive force.

My explosive compound will not explode by ordinary concussion but requires the initial explosion of a detonating cap to render it active. This feature is of importance in that it obviates the possibility of accidents so commonly occurring by the explosion in mines by striking the nitro-glycerin powders remaining in missed holes.

I am aware that hitherto explosive compounds have been made in the manner described and specified in the U. S. Patents to Everard Steele, numbered respectively 762,447 and 799,687 and in German patent as 188,829 to J. H. Van Schleinitz, which described an explosive similar to said Steele patents and I am practically acquainted with the character and methods of making such explosive compounds consisting of a nitrated mixture of resin with a vegetable meal or a starch meal with an oxidizing agent. In all of such explosive compounds the object sought and which was obtained is to produce an explosive compound in a granular form in which the nitrated product, being dissolved by means of a volatile organic fluid, forms a shell or protective coating around the oxidizing agent, which is unaffected by the dissolving fluid and remains in its original state within this shell or coating. Such powders are claimed to be stable and unaffected by moisture on account of the nitrated product which forms such shell or coating, being unaffected by moisture and forming a protective coating or shell around the oxidizing agent which is readily dissolved in, and affected by, the action of moisture. It is therefore the aim and purpose, in producing such explosive compounds, to use such proportions of resin and vegetable or starch meals or flour and such character of meal or flour and such methods in producing the nitrated product as will produce a product having the greatest resistance to, and unaffected by, the action of water or moisture.

My explosive compounds described in these specifications differ entirely from explosive compounds of the description above mentioned; and throughout the process of production of my explosive, the aim and method is to produce a nitrated product and an explosive compound of an entirely different character and combination.

My aim and method in producing my explosive compound is to procure a nitrated product which is to the greatest possible extent an absorbent for water or a solution brought about by water. I therefore use such proportions of pulverized resin and pulverized grains (preferably ordinary wheat) and such character of grains, and such methods of nitration as will give me a nitrated product which is to the greatest possible extent an absorbent of water or solutions brought about by water, so that in the production of my explosive compound, the combination of the nitrated product and the oxidizing agent is effected in the presence of water which partly or wholly dissolves the oxidizing agent which is absorbed by the nitrated product, forming a homogeneous mass of a uniform character through its composition. The combination of a nitrated product and an oxidizing agent in the manner described is entirely new and novel and has many advantages over the production of a chlorate of potash explosive in any other manner. The explosive compound being a homogeneous mass, uniform throughout its entire composition, gives better results than any other explosive compounds made with chlorate of potash. The combination of the nitrated product and the oxidizing agent being effected by means of water or other fluid of similar character, makes the act of this combination one of perfect safety and of the least possible cost and greatest possible convenience.

In the production of my nitrated product I do not wash the same or treat the same with water in any manner, and the first and only use of, or introduction of, water in manufacturing my explosive compound is the use of water for combining the nitrated product and the chlorate of potash.

While I have herein set forth the preferred materials and the proportions thereof, I prefer to employ in the manufacture of my explosive, I wish it to be understood that I do not limit myself to such exact materials and proportions thereof. For instance, instead of employing grains of wheat, I may use other grain or cereal or other equivalent substance, and may also use oxidizing agents other than chlorate of potash.

I claim as my invention:

1. The herein described explosive consisting of a homogeneous mixture of nitrated pulverized cereal and resin containing water-soluble matter impregnated with a suitable oxidizing agent in substantially the proportions described.

2. The herein described explosive consisting of a homogeneous mixture of nitrated pulverized cereal and resin containing water-soluble matter impregnated with chlorate of potash in substantially the proportions described.

3. The herein described explosive consisting of a homogeneous mixture of the herein described nitrated wheat flour and resin containing water-soluble matter impregnated with potassium chlorate in substantially the proportions described.

4. The herein described explosive, consisting of the entire product of a mixture of pulverized cereal, resin and nitric acid in substantially the proportions indicated, impregnated with a suitable oxidizing agent.

5. The herein described entire product of a mixture of pulverized cereal, resin and nitric acid in substantially the proportions indicated.

6. A nitrated product for use in forming an explosive compound, consisting of the products of a mixture of pulverized resin and pulverized cereal and sufficient nitric acid to put the mixture of resin and cereal into a porous cake.

7. A nitrated product for use in forming an explosive compound, consisting of the products of a mixture of pulverized resin and pulverized whole wheat flour and sufficient nitric acid to put the mixture of resin and whole wheat flour into a porous cake.

8. A nitrated product for use in forming an explosive compound consisting of an unwashed mixture of nitrated resin and pulverized cereal.

9. An explosive compound consisting of a homogeneous mixture of chlorate of potash and a nitrated product of pulverized resin and pulverized cereal to which has been added sufficient nitric acid to put the entire mixture of cereal and resin into a porous cake.

10. The herein described explosive consisting of a homogeneous mixture of the entire product of nitrated pulverized cereal and nitrated resin impregnated with chlorate of potash in substantially the proportions described.

11. The herein described explosive consisting of a homogeneous mixture of the entire product of nitrated whole wheat flour and nitrated resin impregnated with chlorate of potash in substantially the proportions described.

12. The herein described explosive, consisting of a homogeneous solidified mass containing the unwashed product of the nitration of pulverized cereal and resin impregnated with chlorate of potash in substantially the proportions described.

13. The herein described explosive consisting of a homogeneous solidified mass containing a mixture of nitrated resin and pulverized cereal including water soluble-matter and a suitable oxidizing agent.

14. The herein described explosive consisting of a homogeneous solidified mass containing an unwashed mixture of nitrated resin and pulverized cereal and a suitable oxidizing agent.

15. The herein described explosive consisting of a homogeneous solidified mass containing an unwashed mixture of nitrated resin and cereal and chlorate of potash.

16. A product for use in forming an explosive compound consisting of a nitrated mixture of resin and cereal containing water-soluble matter.

17. An explosive compound consisting of a suitable oxidizing agent and a nitrated mixture of pulverized cereal and resin containing water-soluble matter to combine the particles in a solid homogeneous mass.

18. An explosive compound consisting of chlorate of potash and a nitrated mixture of pulverized cereal and resin containing water-soluble matter to combine the particles in a solid homogeneous mass.

19. The herein described process of producing a nitrated product for explosives, which consists in adding to a mixture of pulverized cereal and resin nitric acid in a quantity just sufficient to form a mass in the form of a porous cake which cake upon being pulverized forms the finished nitrated product.

20. The herein described process of producing a nitrated product for explosives which consists in adding to a mixture of pulverized cereal and resin nitric acid in a quantity just sufficient to form a mass in the form of a porous cake, drying the cake and then pulverizing it.

21. The herein described process of producing a nitrated product for explosives which consists in mixing finely ground resin and whole wheat flour in substantially the proportions indicated, and adding thereto nitric acid in a quantity just sufficient to form a mass in the form of a porous cake which cake upon being pulverized forms the finished nitrated product.

22. The herein described process of producing an explosive compound which consists in nitrating a pulverized cereal and resin by subjecting them to the action of nitric acid alone and mixing said product with a suitable oxidizing agent and water until a homogeneous mass is produced.

23. The herein described process of producing an explosive compound which consists in subjecting pulverized cereal and resin to the action of just sufficient nitric acid to form a porous cake, pulverizing said cake, and mixing it with a suitable oxidizing agent and water until a homogeneous mass is produced.

24. The herein described process of producing an explosive compound which consists in subjecting pulverized cereal and resin to the action of just sufficient nitric acid to form a porous cake, pulverizing said cake, mixing it with a suitable oxidizing agent and water until a homogeneous mass is produced, compressing said mass into shape, and drying it.

25. The herein described process of producing an explosive compound which consists in subjecting a mixture of finely ground cereal and resin in substantially the proportions indicated, to the action of just sufficient nitric acid to form a porous cake, pulverizing said cake, and mixing it with chlorate of potash and water until a homogeneous mass is produced.

In testimony whereof I have hereunto signed my name to this specification in the presence of two subscribing witnesses.

GEORGE LEZINSKY.

Witnesses:
WALTER A. PAULING,
T. E. HARDENBERGH, Jr.